(12) United States Patent
Hoffman et al.

(10) Patent No.: US 6,564,996 B2
(45) Date of Patent: May 20, 2003

(54) SYSTEM AND METHOD OF CORRELATING A CHECK TENDERED AS PAYMENT FOR A PURCHASE TO THE PARTICULAR PURCHASE TRANSACTION

(75) Inventors: Mark S. Hoffman, Lawrenceville, GA (US); Vernon W. Tarbutt, Kitchener (CA)

(73) Assignee: NCR Corporation, Dayton, OH (US)

( * ) Notice: Subject to any disclaimer, the term of this patent is extended or adjusted under 35 U.S.C. 154(b) by 204 days.

(21) Appl. No.: 09/751,718

(22) Filed: Dec. 29, 2000

(65) Prior Publication Data

US 2002/0084320 A1 Jul. 4, 2002

(51) Int. Cl.[7] .............................. G06K 7/10; G06F 17/60
(52) U.S. Cl. .................. 235/379; 235/382; 235/462.01
(58) Field of Search ................................. 235/380, 375, 235/382, 449, 382.5, 379, 492, 435, 436, 472.01, 462.01; 705/40, 14, 44, 64, 72; 382/232, 311, 139, 138; 302/20

(56) References Cited

U.S. PATENT DOCUMENTS

| | | | | | |
|---|---|---|---|---|---|
| 5,187,351 | A | * | 2/1993 | Clary | 235/379 |
| 5,359,667 | A | * | 10/1994 | Borowski et al. | 382/138 |
| 5,488,671 | A | * | 1/1996 | Kern | 235/379 |
| 5,649,114 | A | * | 7/1997 | Deaton et al. | 705/14 |
| 5,679,940 | A | * | 10/1997 | Templeton et al. | 235/375 |
| 5,748,780 | A | * | 5/1998 | Stolfo | 382/232 |
| 5,925,865 | A | * | 7/1999 | Steger | 235/375 |
| 6,055,327 | A | * | 4/2000 | Aragon | 382/138 |
| 6,106,020 | A | * | 8/2000 | Leef et al. | 235/380 |
| 6,125,196 | A | * | 9/2000 | Carey et al. | 235/379 |
| 6,182,896 | B1 | * | 2/2001 | Momose | 235/439 |
| 6,338,049 | B1 | * | 1/2002 | Walker et al. | 235/379 |
| 6,431,439 | B1 | * | 8/2002 | Suer et al. | 235/380 |
| 2002/0128967 | A1 | * | 9/2002 | Meyer et al. | 705/40 |

FOREIGN PATENT DOCUMENTS

| | | | |
|---|---|---|---|
| EP | 1 011 061 A2 | * | 6/2000 |
| WO | WO 00/74006 A1 | * | 12/2000 |

* cited by examiner

*Primary Examiner*—Thien M. Le
(74) *Attorney, Agent, or Firm*—Maginot, Moore & Bowman LLP

(57) ABSTRACT

A system and method of generating a tender code for a purchase transaction and associating the generated tender code with both a payment and a produced digital receipt for the purchase transaction is described. The tender code may be assigned at several points in the purchase transaction. The digital receipt with the tender code is stored, preferably in a data warehouse. The data warehouse allows easy indexing of the digital receipt data including the tender code. The payment, such as a check, is encoded or affixed with the tender code such that the payment is correlated or linked to the digital receipt and thus the particular purchase transaction to which the payment applied. The tender code may be encrypted and/or contain auxiliary data. The auxiliary data may be device readable to allow a holder to access various information and/or data via an access device such as a document processing device. The present system provides greater verification and/or validation of payment for a purchase and the purchase transaction.

21 Claims, 7 Drawing Sheets

Store, Inc.
Purchase Transaction Record
May 15, 2000
4:23 PM

Store #: 123
555 Main Street
Anywhere, USA ph. (123) 555-1234
fax (123) 555-2345

| QTY | Item(s) Purchased | Unit Price | Cost | UPC # |
|---|---|---|---|---|
| 1 | Item A | $ 3.99 | $ 3.99 | 6050705 |
| 2 | Item B | $ 2.75 | $ 5.50 | 3458909 |
| 3 | Item C | $ 0.53 | $ 1.59 | 9876354 |
| 4 | Item D | $ 2.49 | $ 9.96 | 0131990 |

Total Items Purchased: 10   Items Cost: $ 21.04
                            Sales Tax   $  1.16  (@5.5%)
                            Total Cost: $ 22.20

Type of Payment: Check   Amount Tendered: $ 22.20
                         Change Due: $  0.00

Customer Name:   Joe Smith
Address:         555 Jones Street
                 Anywhere, USA
E-mail:          joe.smith@anywhere.net
Customer Loyalty ID#:  1234567890

Tender Code

SYSTEM AND METHOD OF CORRELATING A CHECK TENDERED AS PAYMENT FOR A PURCHASE TO THE PARTICULAR PURCHASE TRANSACTION

FIELD OF THE INVENTION

The present invention relates generally to purchase transactions and, more particularly, to a system and method for correlating a check tendered in payment for a purchase to the purchase transaction.

DESCRIPTION OF THE PRIOR ART

A consumer in today's marketplace has a variety of options with regard to where to purchase goods and/or services as well as how to pay for the purchase. A consumer may purchase goods and/or services from a retail store, on-line (i.e. via the Internet), via the telephone, or via mail order. A purchase of goods and/or services from anywhere via any means constitutes a purchase transaction. In all purchase transactions there is payment for the goods and/or services. Payment may be made in cash, by check, by credit card, by debit card, or any other method.

As evidence of the purchase transaction, a receipt is generated and given to the consumer (buyer). Because the purchase transaction is typically entered into a computer controlled device to calculate the sale, compute sales tax, and perform various other functions, it is known to provide an electronic or digital receipt for the purchase of such goods and/or services. The digital receipt is generated and stored by the business and then delivered via electronic mail (e.g. by e-mail via an electronic network) to the customer/purchaser. Electronic mail, using either a public or open network such as the Internet, or a proprietary network, is a simple means of communicating digital information (i.e. the digital receipt) from one location to another location. Digital receipts are easily stored and retrieved. As such, the data contained in digital receipts is easily accessible. Thus, the digital receipt provides a means for retailers, merchandise suppliers, distributors and Internet retailers to provide purchase transaction and other information to the consumer.

In U.S. Pat. No. 5,739,512 entitled Digital Delivery of Receipts, issued on Apr. 14, 1998 to Tognazzini, there is disclosed a system that that stores or transmits receipt information digitally for later use. The receipt information may be delivered over a proprietary or an open network such as the Internet to an email address. The e-mail address is embedded into a bank card or other machine readable card that is used for the purchase.

Even though the Tognazzini patent discloses a system that can generate and send an electronic receipt to a customer, such delivery of an electronic receipt does not provide further value to either the customer or retailer other than the compilation of data inherent in an electronic receipt, the quick delivery thereof, and the convenience of electronic retention. It does not provide a correlation to a check tendered for payment.

A problem exists in the digital receipt domain for payments made by non-cash, non-credit/debit cards, such as by checks. When a consumer makes a payment by check, the funds are not immediately transferred or credited to the seller. As well, it is difficult to trace the check to the particular purchase transaction. With payment by cash, the transfer of funds is immediate. There is no need to "trace" the payment. As well, with payment by debit card, the transfer of funds is immediate. Additionally, there is a transaction number associated with the debit card payment that is assigned by the debit card company (i.e. bank), the seller, or both. Therefore, the payment by debit card is traceable. With payment by credit card, the transfer of funds is likewise immediate and there is a transaction number associated with the purchase transaction that is assigned by the credit card company, seller, or both. Again, the payment by credit card is traceable.

However, with payment by check, there is no immediate transfer of funds. As well, the tendered check is not in any manner associated with the purchase transaction. The check must be forwarded to a clearing house, then to the bank for verification and/or validation for payment to the seller. In cases where the seller verifies the check during the purchase transaction, the tendered check is not associated with the purchase transaction. Thus, the consumer and/or seller cannot readily verify and/or validate that a particular check was tendered in payment for the goods and/or services purchased. This is especially a problem in Internet retail or in any sale where a check is tendered after the purchase transaction, particularly in C.O.D. (cash on delivery) situations. An additional challenge is presented by returns and verification processes. In the cases where the check is received after shipment of the goods or performance of the services, it is difficult for the seller to correlate a check payment with the goods sold and/or services rendered.

What is therefore needed is a system and/or method for correlating a payment for a purchase to the purchase transaction and/or to purchased items, merchandise, and services.

What is therefore further needed is a system and/or method for correlating a check tendered as payment for a purchase to the purchase transaction and/or purchased items, merchandise, and services.

SUMMARY OF THE INVENTION

The present invention provides a system, method and apparatus for correlating a payment for a purchase to the particular purchase transaction. Such correlation aids in the verification and/or validation of the payment for the purchase, especially in the context of an electronic purchase transaction environment. In on respect, the check is indexed to purchases and/or purchase transactions.

In particular, the present invention provides a system, method and apparatus for correlating a payment made by a check for a purchase, to the purchase transaction via a tender code. More particularly, the tender code is associated with the check and a digital receipt generated for the purchase transaction. The tender code may be encrypted and include auxiliary data. The auxiliary data may be embedded in to the tender code or appended thereto.

In one form, the present invention is a method of correlating a check to a purchase transaction. This method may be carried out, for example, utilizing a variety of computer controlled devices, one of which is the retail terminal presented herein. The method includes the steps of (a) receiving a check as payment for a purchase transaction; (b) generating a tender code for the purchase transaction; (c) associating the tender code with the check; (d) generating a digital receipt for the purchase transaction; and (e) associating the tender code with the digital receipt. Associating the tender code with the check may include printing the tender code onto the check.

In another form, the present invention is a method of correlating a check given in payment for a purchase to the purchase transaction. The method comprises the steps of: (a) receiving a check given in payment for a purchase transaction; (b) generating a digital tender code unique to the purchase transaction; (c) producing a digital receipt of the purchase transaction; (d) appending the digital tender code to the digital receipt; and (e) affixing the digital tender code to the check. The digital tender code may be affixed to the check during a check verification process.

In yet another form, the present invention is a computer controlled device for correlating a check to a purchase transaction. The device includes a processing unit, memory and a slip printer in communication with the processing unit. The memory is in communication with the processing unit and contains a plurality of instructions or code. The plurality of instructions, when executed by the processing unit, causes the processing unit to: (i) provide a tender code in response to receipt of a check as payment for a purchase transaction; (ii) print the tender code onto the check utilizing the slip printer; (iii) generate a digital receipt for the purchase transaction; and (iv) append the tender code to the digital receipt.

In still another form, the present invention is a retail terminal. The retail terminal includes a processing unit, a network interface, memory, and a printer. The network interface is in communication with the processing unit and operable to be in communication with an electronic network. The printer is in communication with the processing unit. The memory is in communication with the processing unit and has stored therein a plurality of instructions which, when executed by the processing unit, causes the processing unit to: (i) generate a digital tender code in response to receipt of a check as payment for a purchase transaction; (ii) print the digital tender code on the check with the printer; (iii) generate a digital receipt for the purchase transaction; and (iv) append the digital tender code to the digital receipt. Additionally, the digital receipt may be forwarded via the electronic network to a data warehouse for storage.

The present invention provides indexing of the check to the purchase transaction. Secure coding aids in resolving fraudulent transactions for returned merchandise. Further, the present invention provides verification of receipt and delivery. Further, the present invention provides a link through the digital receipt for the business to accumulate behavioral information for future marketing and merchandising.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views.

DETAILED DESCRIPTION

Figure 1:
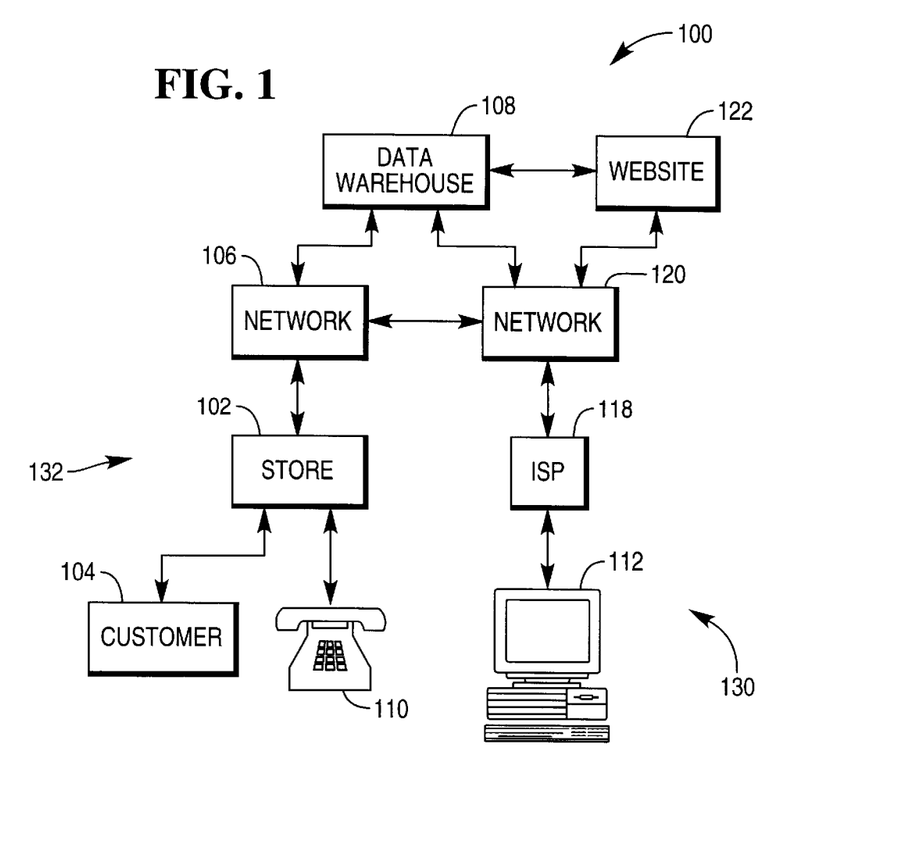
FIG. 1 is a block diagram of a system for implementing the principles of the present invention.

Referring now to FIG. 1, there is depicted a diagram of an overall system, collectively generally designated 100, that is able implement the various aspects and/or principles of the present invention. It should initially be understood that the system 100 as depicted in FIG. 1 is representative or exemplary of a business having a brick and mortar location (store) and a web site, each of which sells goods and/or services. The system 100 is not intended to be an exact representation of any particular system nor is it intended to imply that only this type of system may implement the various aspects and/or principles of the present invention. The system 100 as shown in FIG. 1 provides a basic model for understanding the various aspects and/or principles of the present invention, the various forms through which the various aspects and/or principles of the present invention may be manifested, and the many ways in which the various aspects and/or principles of the present invention may be carried out. As well, the system 100 illustrates the many ways in which a business may sell goods and/or services and by which a consumer may make a purchase transaction. It should be appreciated that a business may not utilize every channel of trade or subsystem of the overall system 100 as depicted.

A purchase transaction transpires whenever a person or entity transfers money (payment) for goods or services. The purchase transaction can be characterized by a plurality of purchase transaction datum (i.e. purchase transaction data). The purchase transaction data is composed of fundamental pieces of datum regarding the purchase transaction such as what was purchased, where it was purchased, who purchased it, how much it cost, how many were purchased, in what manner was payment tendered, when did the transaction take place, etc. This type of data is obtained and/or generated during a purchase transaction by a variety of purchase transaction devices from a simple cash register to automatic electronic transaction terminals. As well, these devices are operable to carry out the present invention. In particular, these devices and/or sub-systems are operable to accept payment for the goods and/or services.

A consumer may purchase goods and/or services in a variety of manners as depicted in FIG. 1. The system 100 includes an Internet subsystem 130 and an in-store subsystem 132. Each of these subsystems 130 and 132 allow a consumer or buyer to purchase goods and/or services from the retailer or seller. The business accepts payment for the goods and/or services in whatever form (i.e. cash, credit, debit, check, money order, etc.) as is customary for the particular payment.

In FIG. 1, a customer 104 may visit a store 102 and purchase goods and/or services. A telephone 110 may be used to call the store 102 and make a purchase. The store 102 will have various retail terminals (see FIG. 2 and detailed below) that allow the store 102 to consummate the purchase. This includes accepting payment and, in accordance with the principles of the present invention, accepts and processes checks tendered for payment. The store 102 is typically in communication with an electronic network 106 that is in communication with a data warehouse 108. Any digital receipt generated by the store 102 as a result of a purchase transaction may be sent over the network 106 to be stored in the data warehouse 108. Another manner in which a consumer may purchase goods and/or services from the store 102 is by utilizing a telephone 110 to call in an order to the store 102.

The business may also operate a web site 122 that is in communication with an electronic network 120 (i.e. the Internet). This provides another subsystem 130 in which a business may sell and the consumer may purchaser goods and/or services. The consumer, represented by the computer 112 (Internet enabled device), is typically in communication with the network 120 via an Internet Service Provider (ISP) 118. In this manner, the consumer 112 may view the web site 122 and purchase goods and/or services therefrom. Payment for the goods and/or services may take any form such as credit/debit card or check. A check may be tendered as payment, typically before the goods arrive or when the goods arrive, such as by C.O.D. (cash on delivery). The web site 122 also generates a digital receipt for the purchase transaction. The web site 122 is in communication with the data warehouse 108 such that the digital receipts generated by the web site 122 may be transmitted to and stored therein.

Figure 2:
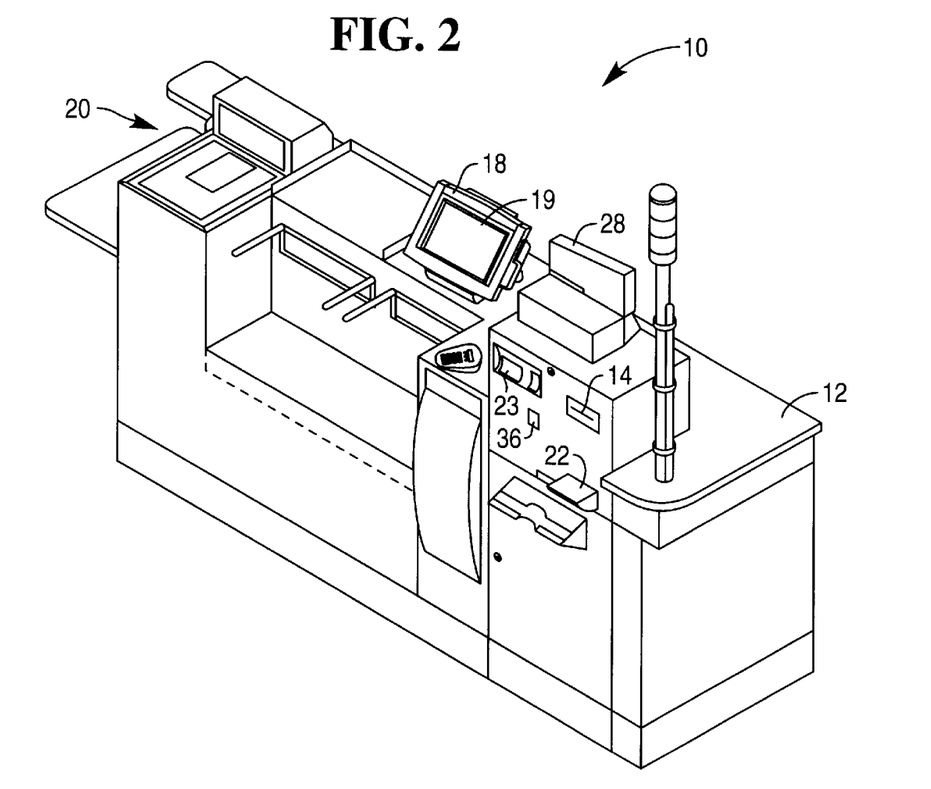
FIG. 2 is a representation of a retail terminal that may be utilized to generate an electronic receipt with a digital tender code per the principles of the present invention and/or process a an electronic receipt in accordance with the principles of the present invention.

As indicated above, the purchase transactions are typically accomplished by retail terminals. Retail terminals may take many forms. The retail terminal performs producing and/or formatting of the transaction data into the digital receipt. In particular, the retail terminal typically processes the transaction data into an electronic or digital form (e.g. an electronic or digital purchase transaction record). With reference now to FIG. 2, there is shown a retail terminal generally designated 10 that is representative of any retail terminal that is operable in accordance with the principles presented herein such as a point-of-sale, point-of-service, or a kiosk. The retail terminal 10 may be configured into any type of similar retail terminal as is known in the art. The retail terminal 10 may be of a consumer interactive type but not necessarily so. As such, the retail terminal 10 may be configured to perform a number of retail functions such as (i) a point-of-sale/point-of-service (POS) retail function, (ii) a product demonstration retail function, (iii) a data collection function, (iv) a passive display function, (v) an interactive, consumer query and answer function, and/or (vi) a bill payment/application access function or the like. Hereinafter, the retail terminal should be understood to include all types of retail terminals and consumer interactive terminals. The retail terminal 10 may be utilized to perform assisted and/or unassisted retail/interactive functions during an active or power-up mode as well as other function modes as described herein.

The retail terminal 10 includes a housing structure 12 that supports a display or monitor 18 for showing video or individual frames or screens depending on the particular mode of the retail terminal 10. The display 18 preferably incorporates a touch-screen 19 as is known in the art that overlays the display 18 and allows user interaction in conjunction with material shown on the display 18. Commonly, such displays are of the LCD type but may be any style or type.

The retail terminal 10 also includes a card reader 14 as is known in the art for obtaining information from a magnetic strip type card, or information from a smart card. The card reader 14 is adapted to obtain various identifying and/or account information from a user's card as in the known in the art and/or obtain information from a smart card. The retail terminal 10 is adapted to accept a PIN for a card inserted into the card reader 14 via a video generated keypad shown on the display 18 in conjunction with a touch-screen 19 (see FIG. 3). Other methods of obtaining a PIN, such as a mechanical keyboard as is known in the art, but not shown, may be used instead of a video generated keypad. The card reader 14 may thus be considered a payment device.

Additionally, the retail terminal 10 may include a speaker assembly 16 (see FIG. 3) that is preferably a stereo speaker assembly for playing music, audio messages and/or instructions and the like. Further, the retail terminal 10 includes a scanner 20 that is positioned to allow the scanning of a bar code or the like brought in proximity thereto. The scanner 20 may be any type of scanner or imager as is known in the art that is capable of capturing or imaging a bar code, graphics or the like. Such a scanner may be a laser type scanner, an LED type scanner, combination thereof, or the like as are well known in the art.

The retail terminal 10 also includes a cash acceptor device 22 that is adapted to receive paper money in various denominations, and thus constitute another type of payment device. A cash acceptor device 23 is adapted to receive coins for payment. The coin cash acceptor is preferably in addition to the paper cash acceptor 22 in order for a user to tender an exact amount of dollars and cents. A slip and/or receipt printer 28 is provided that prints receipts and/or accepts (i.e. receives and reads) checks tendered for payment. The printer 28 is also operable to frank (mark, print, or affix) the received check with a tender code per the principles presented herein, and either keep the franked check or return the franked check to the consumer. With card reader 14 the cash acceptor(s) 22 and 13, and the slip printer 28 (collectively "payment devices"), the retail terminal 10 is adapted and/or configured to receive/accept payment from a user and function in accordance with the principles presented herein.

It should be appreciated that the retail terminal 10 shown in FIG. 2 may have other components that are not specifically mentioned herein but may be shown. These other components are generally known in the art. Additionally, the retail terminal 10 may be located anywhere either as a stand-alone self-contained unit, or as coupled to a network as a networked stand-alone terminal or workstation type unit. The principles of the present invention may likewise be incorporated into an existing retail unit/system.

Figure 3:
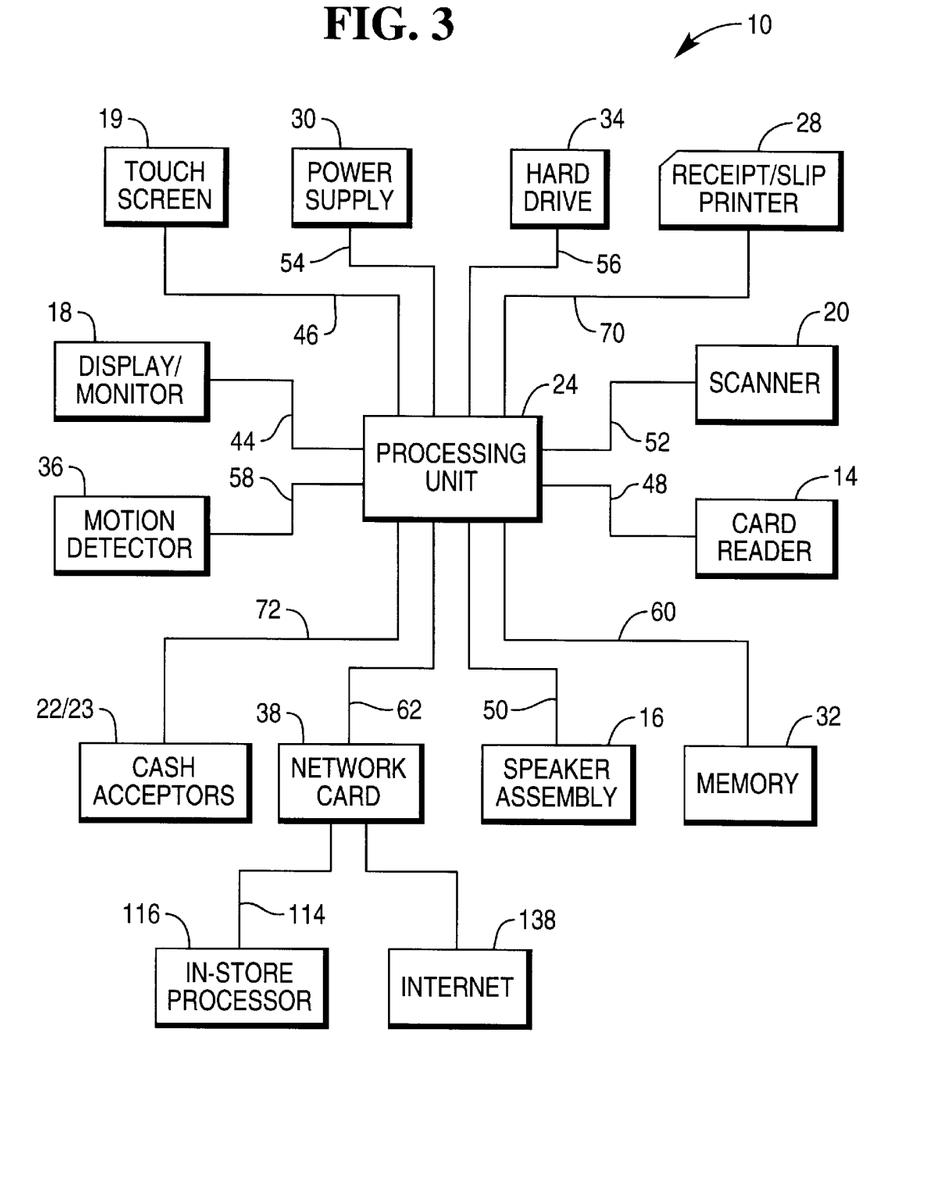
FIG. 3 is a block diagram of the various components of the retail terminal of FIG. 2.

Referring now to FIG. 3, there is depicted a block diagram of the various components of the retail terminal 10 and their interconnection(s). It should be understood that some components may be internal to the housing 12 of the retail terminal 10 and thus not shown in FIG. 1. As well, the block diagram of FIG. 3 is applicable to other types of retail terminals, kiosks, and the like.

The retail terminal 10 has a processing unit or circuitry 24 as is known in the art that includes a processor or microprocessor and associated circuitry as the main controller for or of the retail terminal 10. The processing unit 24 is in electronic communication with a typical power supply 30 via a power line 54. The power supply 30 is coupled to a source of electricity (not shown) and is transformed appropriately as is known in the art for use by the processing unit 24.

The card reader 14 is electronically coupled to the processing unit 24 via a communication line 48 that allows communication between the processing unit 24 and the card reader 14. Information from a user's card is thus obtained by the card reader 14 and used/processed by the processing unit 24. This may occur during ordering of a product and/or payment thereof, the retrieving of information. One manner of payment may be through a debit card, a charge card, a smart card, or the like (collectively "card"). Information from the card is obtained via the card reader 14.

The display 18 is electronically coupled to the processing unit 24 via a communication line 44 that allows communication between the processing unit 24 and the display 18. The display 18 is used to show various icons, graphics, windows, video, screens and/or areas (i.e. PIN entry area, billing application screen, etc.), and through the touch-screen 19 has capabilities that allow for user/consumer interaction with the retail terminal 10. The touch-screen 19 overlays the display 18 and is in electronic communication with the processing unit 24 via communication line 46 to operate in conjunction with the display 18.

Additionally, the speaker assembly 16 is also electronically coupled to the processing unit 24 via a communication line 50 that allows audio information (stereo or mono) to pass to the speakers. The audio information may be music, discourse (i.e. messages, instructions, answers to queries, or the like), or a combination of music and discourse.

Further, the scanner 20 is electronically coupled to the processing unit 24 via a communication line 52 that allows communication between the processing unit 24 and the scanner 20. The scanner 20 is adapted to obtain a scan of a bar code and/or graphics on an object in proximity thereto such as a product, label or tag having a UPC (universal product code). In order to accomplish a scan, the consumer moves the object (e.g. product) thereunder such that the bar code on the object may be read by the scanner 20. The scanner 20 is typically always in an active mode during normal operation of the retail terminal such that the bar code of an object will be immediately scanned or read when the object is placed thereunder. The scanner 20 may also read other information, coded or not, in various forms.

The retail terminal 10 may additionally include a motion detector 36 that is electronically coupled to the processing unit 24 via a communication line 58. The motion detector 36, in conjunction with the processing unit 24 and associated software, can be used to detect whether a customer is within a detection zone around the retail terminal 10 in order to allow the retail terminal 10 to perform an action or enter into a certain mode of operation.

As an example, the motion detector 36 and scanner 20 may work in tandem such that the scanner 20 is normally off when the motion detector 36 does not detect the presence of a consumer within the detection zone, but which activates the scanner 20 when a consumer is within the detection zone. After a predetermined time of inactivity, the scanner 20 may be deactivated until another triggering event has occurred (e.g. a consumer within the detection zone). As well, various types of motion of a consumer within the detection zone may trigger the scanner into activation.

The retail terminal 10 may include a hard drive 34 or other similar local or internal mass storage device that is in electronic communication with the processing unit 24 via a communication line 56. The hard drive 34 may be used to store programs or the like, and any other information that allows the retail terminal 10 and its various components to function in accordance with the principles presented herein. The programs may be stand-alone programs for the operation of the retail terminal 10 or may be supplementary (e.g. modules) to main programs stored on the network 106. The hard drive 34 may also locally store program instructions as described below that can be correlated to various purchase transaction data which is obtained/acquired during a purchase transaction that has transpired on the retail terminal 10. This includes a check tender code generator operable to accomplish the features and/or functions described herein, and instructions to frank a check via the slip printer 28, and provide the appropriate associations between the generated tender code and a generated digital receipt and the check.

As well, the processing unit 24 may be in communication with a memory device (or devices) 32 such as RAM or ROM via communication line 60 that may be used to temporarily or permanently store program/program instructions/modules/components and other information as is necessary for operation of the retail terminal 10. The memory 32 may also store program information (programs/instructions) for the operation of the retail terminal and its components as described herein. Other program instructions required to carry out the various functions as described herein may also be stored therein.

A network card 38, modem or the like (collectively network card) may be installed in the retail terminal 10. The network card is in electronic communication with the processing unit 24 via a communication line 62. The network card 38 allows the connection of the retail terminal 10 to the in-store processor 116 via network 114. The network card 38 also allows connection to the Internet 138 (see FIG. 1) via the in-store processor 116 through the central office 120.

The retail terminal 10 is in electronic communication with the receipt/slip printer 28 via a communication line 70 for providing a printout or hard copy of information regarding a transaction or transaction data during or after a purchase transaction such as a receipt or the like. As well, the printer 28 is operable to may print on the check a generated tender code or print a label having the generated tender code or to be applied to the check. In particular, the printer 28 preferably affixes the generated tender code to the received check, preferably by franking (marking or imprinting) either or both the front and back of the check. The memory 32 typically temporarily stores program instructions that are executable by the processing unit 24 in order for the retail terminal 10 to process the purchase transaction.

Processing of the purchase transaction via the retail terminal 10 includes the ability to scan and/or receive input data regarding a product or service, obtain, produce and/or generate various transaction data regarding the purchase, obtain payment for the purchase transaction, generate a digital receipt of the transaction, and generate a tender code when payment is made, or is to be made, by check. The transaction receipt may be provided on paper, but in accordance with the principles of the present invention, the receipt is preferably electronic or electronically formatted such as in digital form for transmission over a network.

The electronically formatted transaction record may be characterized as a digital receipt. In its electronically formatted (or digital) form, the transaction receipt may be transmitted over a network, or over various networked networks, to any device in communication with the network and adapted to receive such electronically formatted documents. Formatting and/or encoding of the transaction receipt may take many forms, of which many are known. The retail terminal may allow a consumer the option of specifying the type of formatting or encoding for the digital receipt in order to be compatible with the type of viewing program on the consumer's networked device (e.g. PC). In accordance with an aspect of the present invention, the digital receipt includes a tender code when payment is made by check.

Figure 4:
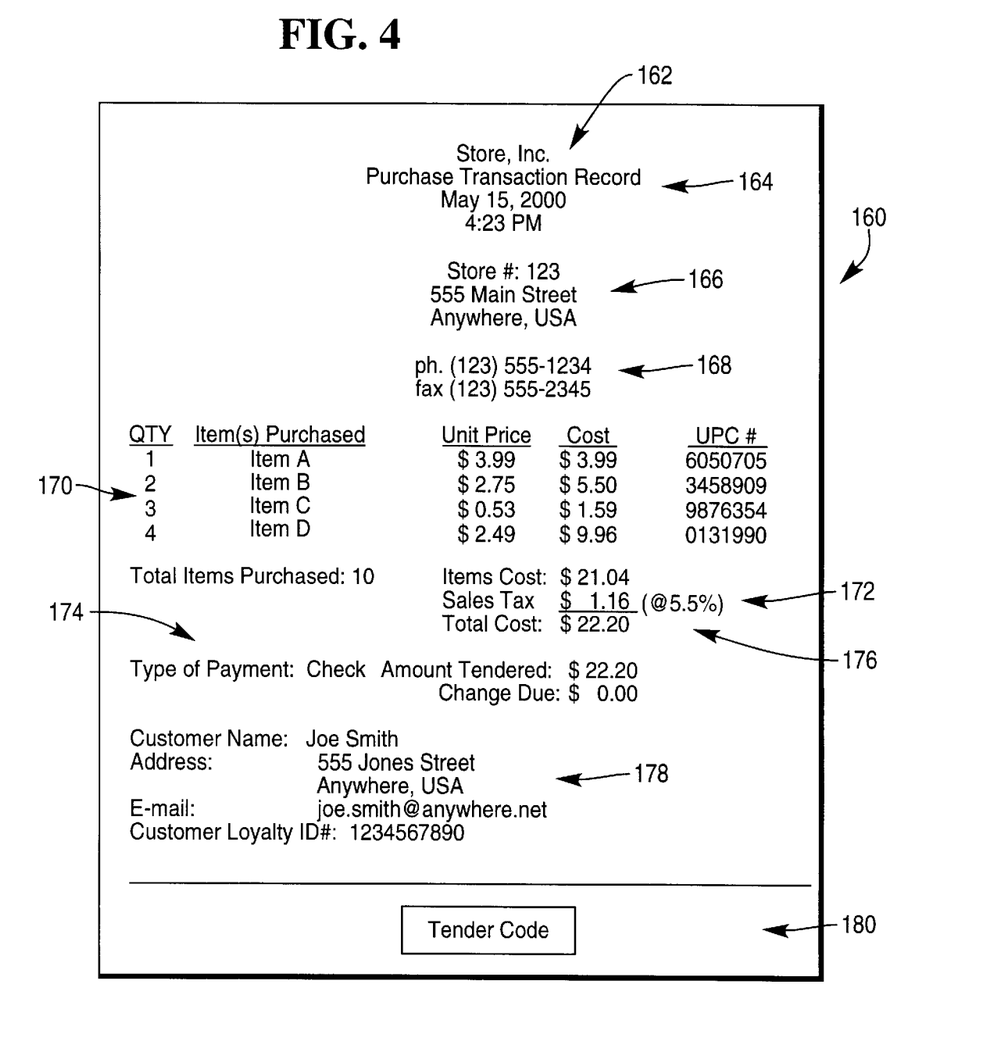
FIG. 4 is a representation of an electronic or digital receipt generated in accordance with the principles of the present invention.

With reference to FIG. 4, an exemplary digital receipt in accordance with the principles of the present invention and in human readable form is shown, generally designated 160. The digital receipt 160 depicts the type of information that is obtained and/or generated during the purchase transaction (i.e. transaction data) and which may be included in the purchase receipt. The information included in the digital receipt 160 may be included in a paper receipt, if one is produced, for the transaction.

The digital receipt 160 may include the name of the merchant, retailer, store, or type of business and/or the like 162 (collectively "store") and the time and date 164. The digital receipt 160 may include a header that identifies itself, here "Purchase Transaction Record." Store particulars 166 may also be included such as store number, street address (i.e. location), telephone and facsimile numbers. A product and/or service area 170 is provided that details the type of product, item or service (collectively "item") purchased (either by full item name or by a truncated item name), the quantity of each item purchased, the unit price of the item, total cost of each quantity of item(s), the universal product code (UPC) or other identifier for the item, and a total number of items purchased. A costing area 172 includes the total cost of all items, a tax paid/data area 176, and a total customer cost. The receipt 160 further contains a payment area 174 that includes the mode or method of payment used by the consumer (i.e. cash, check, credit card, debit card, etc.). If necessary, an amount tendered area and change due area are also included.

It should be appreciated that the transaction data or information shown on the digital receipt 160 is only exemplary of the many pieces of transaction datum that is obtained/generated by or during the purchase transaction. The structure, layout, and/or form of the digital receipt 160 is also only exemplary. The digital receipt is electronically formatted transaction data (i.e. compilation of transaction datum) that may be compiled, combined and/or assembled in various ways.

In accordance with an aspect of the present invention, the digital receipt 160 includes a tender code 180 that is formatted for electronic transmission over the network along with or appended to the digital receipt 160. The tender code 180 is generated or produced by the retail terminal 10 when a check is tendered for payment for goods and/or services. The tender code 180 is associated with the digital receipt and the received check (see FIGS. 7 and 8) and may be stored in the retail terminal on which the purchase transaction transpired, or may be stored in the central office 120 to which the digital receipt 160 is transmitted from the retail terminal or on which the digital receipt 160 is compiled and formatted for transmission in the case that the retail terminal does not do so.

Figure 7:
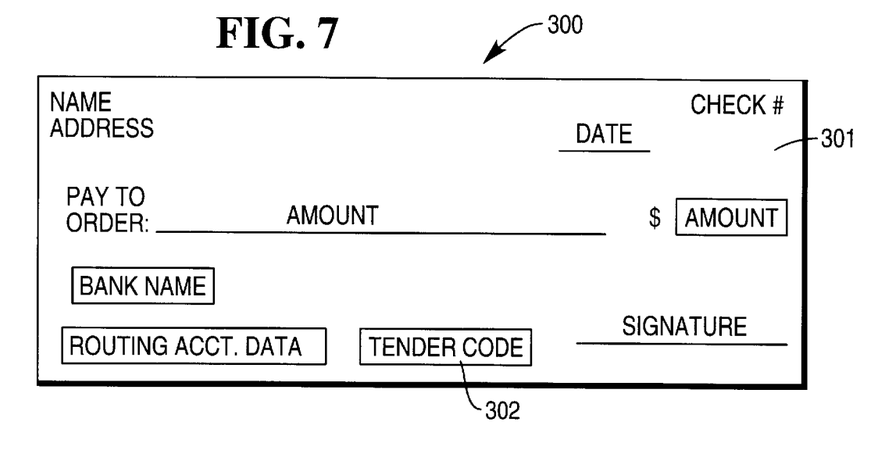
FIG. 7 is a representation of a front of a check received for payment and marked in accordance with the principles presented herein.
Figure 8:
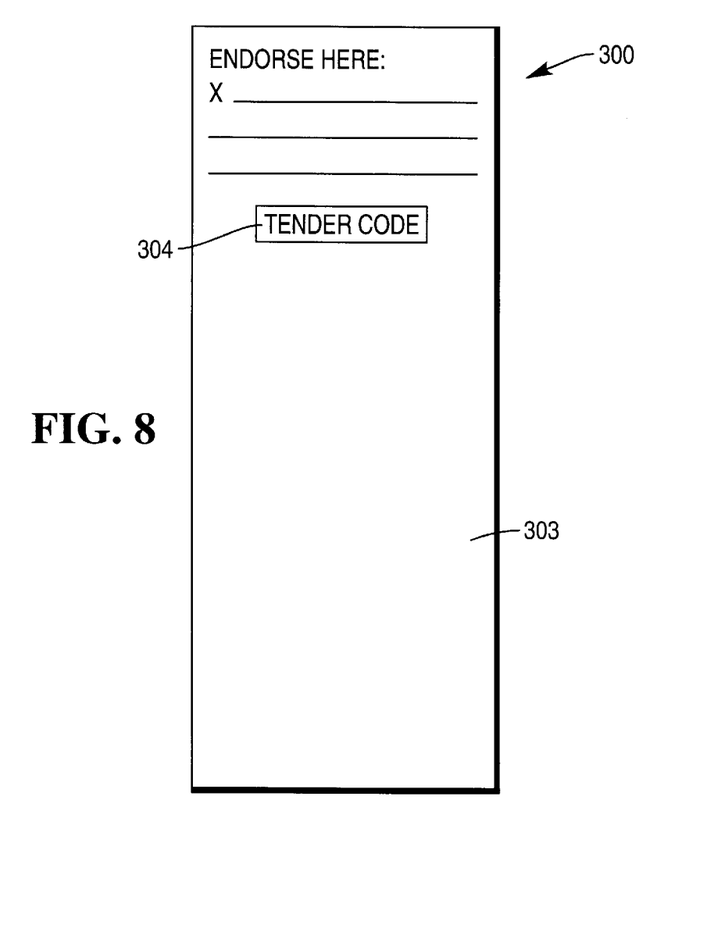
FIG. 8 is a representation of a back of a check received as payment and marked in accordance with the principles presented herein.

In accordance with an aspect of the present invention, when a check is tendered for payment, the retail terminal 10 produces or generates a tender code. The tender code is unique to the particular purchase transaction. The tender code is associated with the digital receipt 160 for that particular purchase transaction as well as being associated with the check tendered for payment such that the check tendered for payment is indexed to the digital receipt generated for the purchase transaction and/or the digital receipt generated for the purchase transaction is indexed to the check tendered for payment. Association with the digital receipt preferably takes the form of appending or attaching the tender code to the digital receipt. Referring to FIGS. 7 and 8, association with the check 300 preferably takes the form of imprinting, affixing, or the like, the tender code 302 onto the front 301 of the check 300 and/or imprinting, affixing, or the like, the tender code 304 on the back 303 of the check 300. With regard to the digital receipt 160, the tender code 180 is appended thereto and preferably becomes a part thereof as depicted in FIG. 4. Thus, when the digital receipt 160 is forwarded and then retained in the data warehouse 120, the particular check tendered for payment that is the subject of the digital receipt is indexed to the digital receipt by virtue of having the same tender code. The check 300 will, as well, be indexed to the digital receipt by virtue of the tender code being placed thereon as well. The consumer may then be able to correlate the particular check to the particular purchase and/or purchase transaction.

Thus, the retail terminal 10 prints the tender code directly on the check, either on the front or back. This indexes or correlates the check to the particular purchase transaction. If the retail terminal 10 does not include check imprinting capabilities, the tender code may be printed as a label or the like and attached to the check. In the case of CODs and other situations where a check is tendered after an order is received, the label and/or the tender code may be generated at the point of delivery. A PDA (personal digital assistant) may be used to perform such a function at the point of delivery. The PDA may as well generate the digital receipt that will be stored in the data warehouse 108.

The tender code may be any type of coding that uniquely identifies the purchase transaction and check tendered for payment. The coding may be accomplished in a manner. The tender code may be encrypted if desired. As well, the tender code may include auxiliary information or data encoded into the tender code. Such auxiliary data may include a URL (Uniform Resource Locator) for the digital receipt within the data warehouse 108. This would allow the consumer to access the information from the data warehouse 108 via their computer 112. The tender code may be printed on the check in a machine readable manner. A device that can read the encoded tender code and/or the auxiliary data may be check processing transports or a clearing house may read the encrypted code to associate the check back to the digital receipt. As an example, such encoding may be a bar code.

Figure 5:
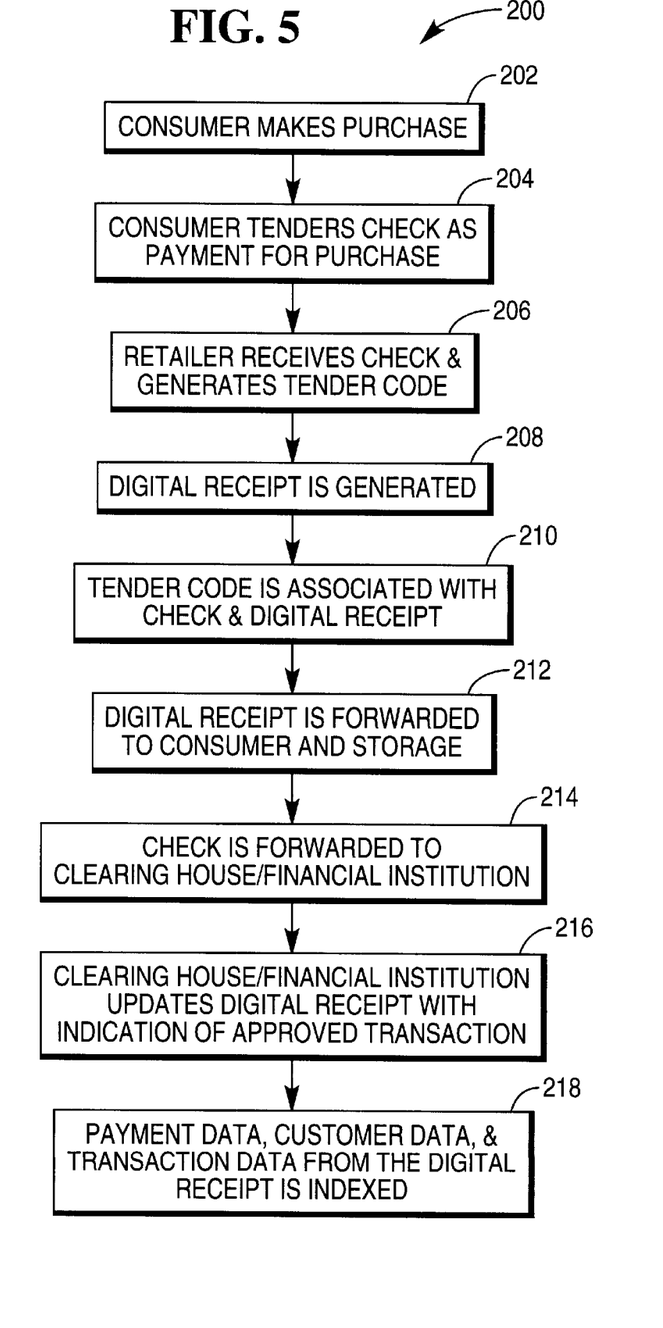
FIG. 5 is a flowchart of an exemplary method of implementing the principles of the present invention.

This procedure is set forth in the flow chart of FIG. 5, and reference is now made thereto. In FIG. 5, a flowchart, generally designated 200 is shown. Initially, the consumer makes a purchase, step 202. The purchase may be goods and/or services. The consumer then tenders payment for the purchase in the form of a check, step 204. Payment may be in any form, but most particularly in the preferred scenario of which the principles of the present invention are best suited, payment is made in the form of a check. Thus, consistent with this exemplary scenario, the remaining steps a check will be assumed to be the payment form. However, it should be appreciated that the principles of the present invention apply to all forms of payment.

The retailer receives the check for the purchase from the consumer, and generates a tender code in response thereto, step 206. This is preferably accomplished on a retail terminal (see above). A digital receipt is then generated by the retailer, step 208. The tender code is a unique identifier that may or may not be encrypted. As well, the tender code may be generated so as to be machine readable. Once the tender code is generated, the tender code is associated with the check and the digital receipt, step 210. The tender code is associated with the digital receipt by adding the tender code to the data that constitutes the digital receipt. As well, the tender code may be indexed to the digital receipt. The tender code is associated with the check by imprinting the tender code onto the check, printing a label or the like and affixing the same to the check, or any other means that puts the tender code onto the check. In the case of other methods of payment, the tender code may be printed onto a paper receipt or other evidence of purchase that the store may give to the consumer. Thus, when the consumer gets the check back from their banking institution (or as held by the bank), the consumer has evidence linking the check as payment to the digital receipt that is for the purchase transaction for the particular goods and/or services.

Next, the digital receipt is forwarded to the consumer and a storage device, step 212. Forwarding of the digital receipt to the consumer is accomplished via e-mail or other similar means. The storage device is preferably a data warehouse that is in networked communication with the retail terminal. The check itself is forwarded to a clearing house, financial institution or the like, step 214. The clearing house/financial institution clears the check (or returns same as unpaid) and updates the digital receipt with an approved transaction indication (or not approved as the case may be), step 216. This may be accomplished by forwarding data to the data warehouse regarding the particular check as indexed to the digital receipt to add the transaction status data. The retailer may decide to manipulate or process the data from the purchase transaction. In this regard, the payment data, customer data, and/or the transaction data from the digital receipt (purchase transaction) are indexed to one another, and/or processed in various ways, step 218.

Figure 6:
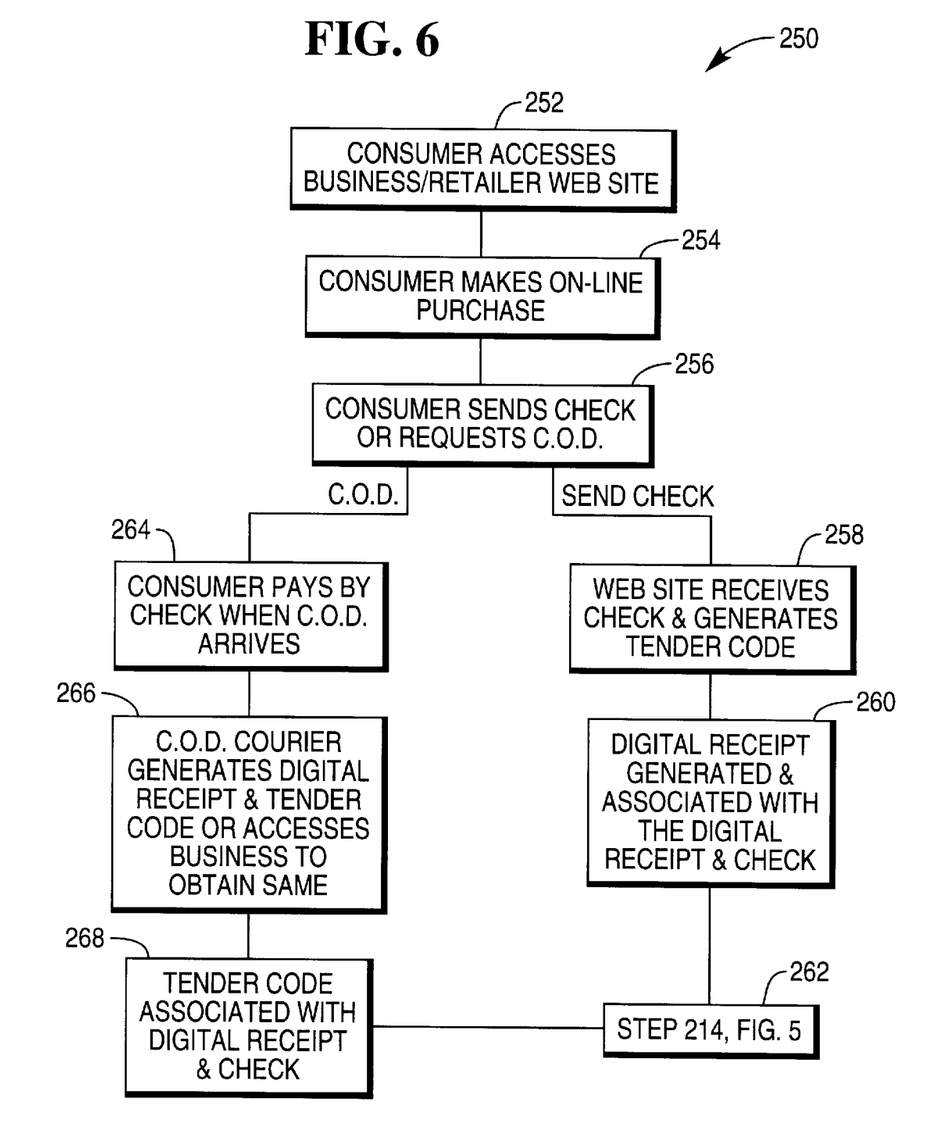
FIG. 6 is a flowchart of another exemplary method of implementing the principles of the present invention.

Referring now to FIG. 6, there is depicted a flow diagram, generally designated 250, of another exemplary manner in which the principles of the present invention may be employed. For purposes of this example, it will be assumed that payment is to be effected via a check. However, it should be appreciated that the principles of the present invention are applicable to other forms of payment.

A consumer accesses a web site of a business/retailer, step 252, in a known manner. The consumer makes an on-line purchase 254 in accordance with the web site. Since it is assumed that the consumer will be paying by check, the consumer then has the option, step 256, of sending the check or requesting C.O.D. If the consumer sends payment, the web site receives the check and generates a tender code, step 258, as described above. A digital receipt is then generated (or at the time of generation of the tender code), and associated with the digital receipt and check, step 260, as described above. Thereafter, the digital receipt is forwarded to the consumer and storage, step 214 (FIG. 5).

If the consumer elects "C.O.D.", then a courier will bring the purchase to the consumer. The consumer pays the courier by check when the purchase arrives, step 264. The courier then generates a digital receipt and tender code for the transaction, step 266. Generation of the digital receipt and tender code in the field by the courier may be accomplished via hand-held computer controlled devices such as a PDA (personal digital assistant) and/or the like. The PDA may be linked to the business web site or will be forwarded to the business web site (i.e. the business) in due course. The tender code is then associated with the digital receipt and the payment, step 268. Such associated may entail the printing of the tender code directly onto the tendered check by the PDA or other device, or may be printed on a label by the PDA or other device, and affixed to the tendered check. Thereafter, the flow continues in the manner of step 214 of FIG. 5.

In step 266, the courier may not generate the digital receipt and/or the tender code in the field, but may access the business instead to obtain the information. Such access may be via a network or the like. In this manner, the business maintains control of the digital receipt and the generation of the tender code. It should be appreciated that variations of the above two exemplary method in accordance with the principles of the present invention are contemplated and within the scope of this invention. As well, other steps may be incorporated into the exemplary methods, such as generation of a paper receipt for the consumer.

If the tender code is generated in a machine readable, a consumer may take the check or printed digital receipt to a device operable to read the tender code. This may provide access to the data warehouse, business web site, etc. regarding the particular purchase transaction/digital receipt. The consumer may then accomplish other business as necessary.

While this invention has been described as having a preferred design and/or configuration, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of correlating a check to a purchase transaction comprising the steps of:
   receiving a check as payment for a purchase transaction;
   generating a tender code for the purchase transaction;
   associating the tender code with the check;
   generating a digital receipt for the purchase transaction; and
   associating the tender code with the digital receipt.

2. The method of claim 1, further comprising the step of:
   affixing the tender code to the check.

3. The method of claim 1, further comprising the step of:
   storing the digital receipt in a data warehouse.

4. The method of claim 3, wherein the step of generating a tender code includes the step of:
   embedding a URL in the tender code, the URL designating a storage location of the digital receipt in the data warehouse.

5. The method of claim 1, wherein the step of generating a tender code includes the step of:
   encrypting the tender code.

6. The method of claim 5, wherein:
   the step of generating a tender code includes generating a tender code that is machine readable.

7. A method of correlating a check given in payment for a purchase to a purchase transaction, the method comprising the steps of:
   receiving a check given in payment for a purchase transaction;
   generating a digital tender code unique to the purchase transaction;
   producing a digital receipt of the purchase transaction;
   appending the digital tender code to the digital receipt; and
   affixing the digital tender code to the check.

8. The method of claim 7, further comprising the step of:
   reading the digital tender code affixed to the check.

9. The method of claim 7, further comprising the step of:
   storing the digital receipt in a data warehouse.

10. The method of claim 9, wherein the step of generating a digital tender code includes the step of:

embedding a URL in the digital tender code, the URL designating a storage location of the digital receipt in the data warehouse.

11. The method of claim 7, wherein the step of generating a digital tender code includes the step of:

encrypting the digital tender code.

12. The method of claim 7, wherein:

the step of generating a digital tender code includes generating a digital tender code that is machine readable.

13. A computer controlled device for correlating a check to a purchase transaction comprising:

a processing unit;

a printer in communication with the processing unit; and memory in communication with the processing unit, the memory having a plurality of instructions which, when executed by the processing unit, causes the processing unit to:

(i) provide a tender code in response to receipt of a check as payment for a purchase transaction;

(ii) print the tender code onto the check utilizing the printer;

(iii) generate a digital receipt for the purchase transaction; and (iv) append the tender code to the digital receipt.

14. The device of claim 13, wherein the memory has further instructions stored therein that causes the processing unit to affix the tender code to the check.

15. The device of claim 13, wherein the memory has further instructions stored therein that causes the processing unit to encrypt the tender code.

16. The device of claim 13, wherein the memory has further instructions stored therein that causes the processing unit to store the digital receipt in a data warehouse.

17. The device of claim 16, wherein the memory has further instructions stored therein that causes the processing unit to embed a machine readable URL within the tender code.

18. A retail terminal comprising:

a processing unit;

a printer in communication with the processing unit;

a network interface in communication with the processing unit and an electronic network; and memory in communication with the processing unit, said memory having stored therein a plurality of instructions which, when executed by the processing unit, causes the processing unit to:

(i) generate a digital tender code in response to receipt of a check as payment for a purchase transaction;

(ii) print the digital tender code onto the check with the printer;

(iii) generate a digital receipt for the purchase transaction;

(iv) append the digital tender code to the digital receipt; and (v) forward the digital receipt via the electronic network to a data warehouse for storage.

19. The retail terminal of claim 18, wherein the memory has further instructions stored therein that causes the processing unit to encrypt the digital tender code.

20. The retail terminal of claim 18, wherein the memory has further instructions stored therein that causes the processing unit to embed a URL in the digital tender code, the URL providing an address for the digital receipt in the data warehouse.

21. The retail terminal of claim 18, wherein the memory has further instructions stored therein that causes the processing unit to provide the digital tender code in machine readable form.

* * * * *